C. F. FREDE & H. M. PFLAGER.
CORE OVEN.
APPLICATION FILED MAY 5, 1911.
1,029,986.
Patented June 18, 1912.
3 SHEETS—SHEET 2.
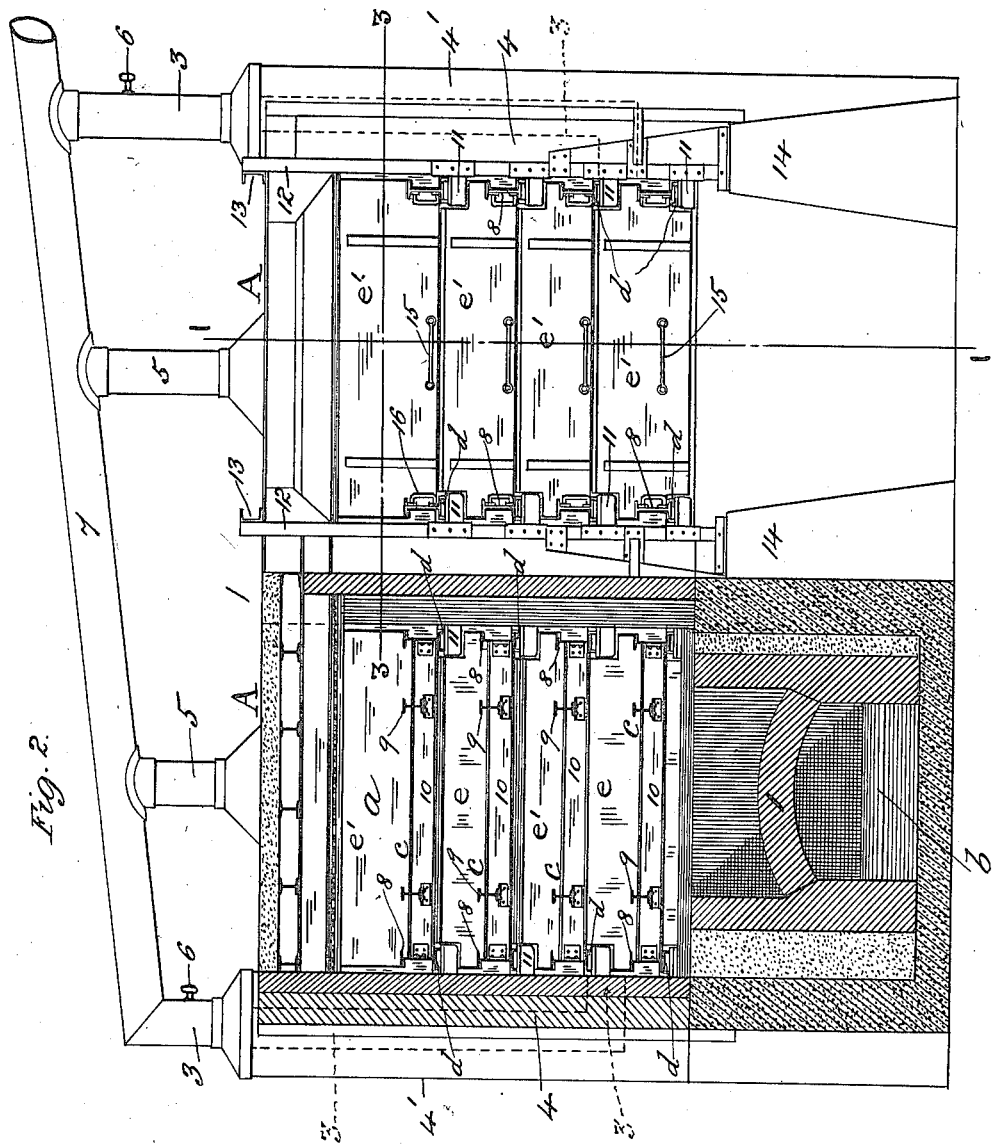

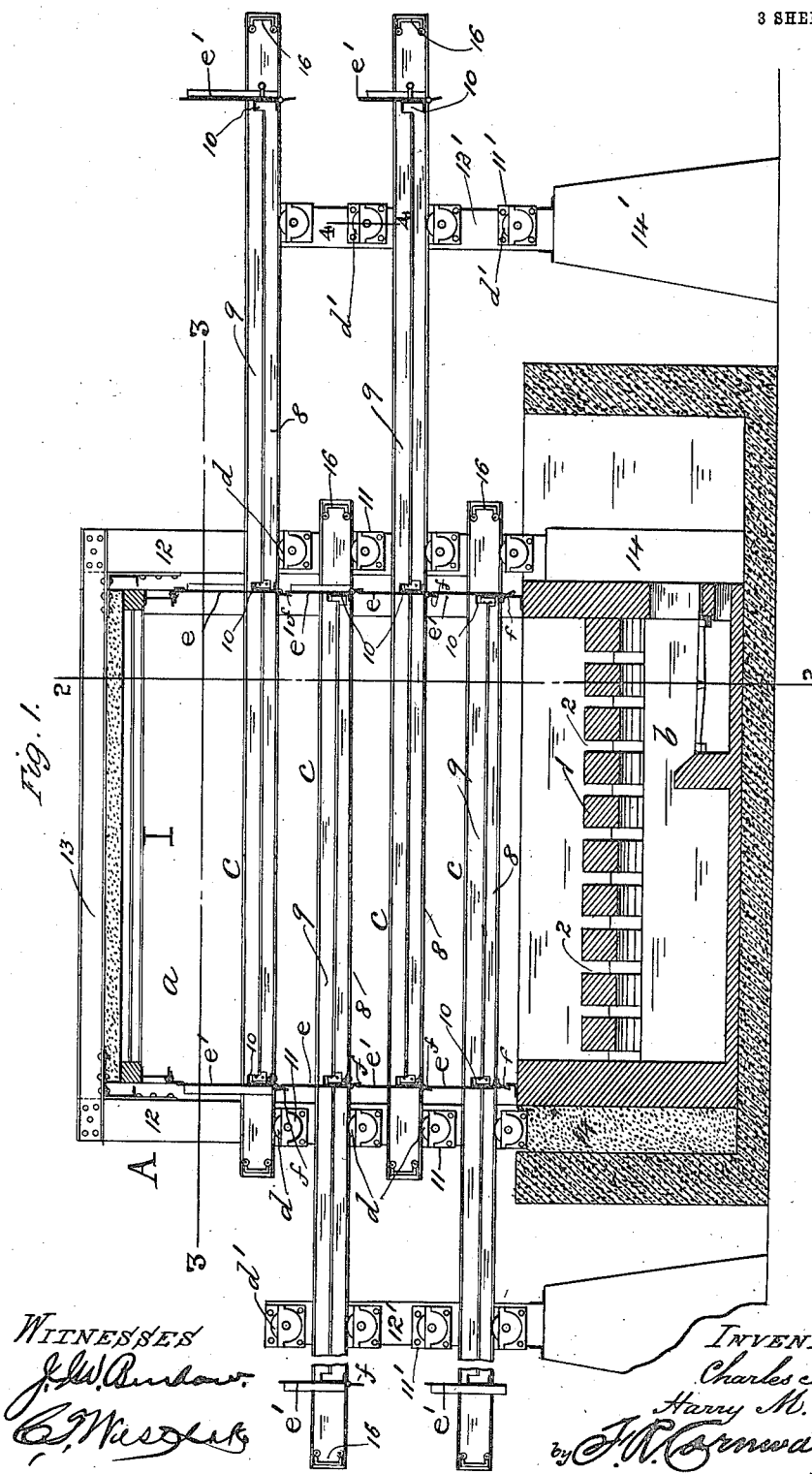

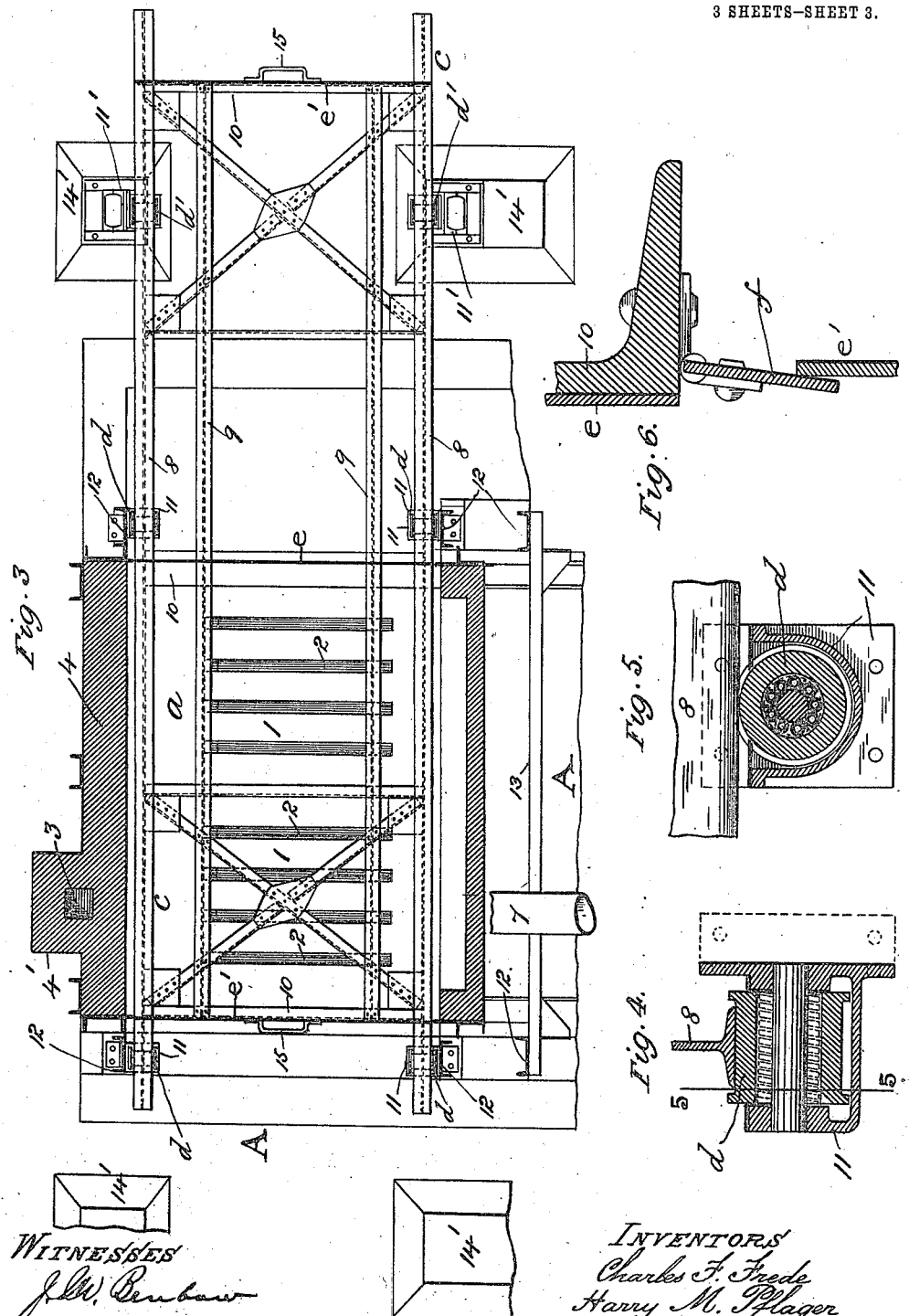

UNITED STATES PATENT OFFICE.

CHARLES F. FREDE AND HARRY M. PFLAGER, OF ST. LOUIS, MISSOURI, ASSIGNORS TO COMMONWEALTH STEEL COMPANY, OF ST. LOUIS, MISSOURI, A CORPORATION OF MISSOURI.

CORE-OVEN.

1,029,986.  Specification of Letters Patent.  Patented June 18, 1912.

Application filed May 5, 1911. Serial No. 625,361.

*To all whom it may concern:*

Be it known that we, CHARLES F. FREDE and HARRY M. PFLAGER, citizens of the United States, residing at St. Louis, Missouri, have invented a certain new and useful Improvement in Core-Ovens, of which the following is a full, clear, and exact description, such as will enable others skilled in the art to which it appertains to make and use the same, reference being had to the accompanying drawings, forming part of this specification, in which—

Figure 1 is a vertical longitudinal section through our improved core oven on line 1—1 in Fig. 2. Fig. 2 is an end elevation of one oven, and a vertical transverse section through an adjoining duplicate oven, which section is taken on the line 2—2 Fig. 1. Fig. 3 is a horizontal section through the oven on line 3—3 of Figs. 1 and 2. Fig. 4 is a vertical longitudinal section on enlarged scale, through one of the rack supporting rollers forming part of our invention, and taken on line 4—4, Fig. 1. Fig. 5 is a vertical transverse section taken on the line 5—5 of Fig. 4. Fig. 6 is a cross section on enlarged scale through one of the hinged door flaps seen in Fig. 1, and forming part of our invention.

Our invention relates to ovens for baking or drying mold cores and the like.

Ordinarily, an oven of this class comprises a drying chamber which is heated from a suitable furnace in communication therewith, the walls of the chamber being lined with fire-brick and its entrance opened and closed by a sliding door suspended by chains which are passed over pulleys and provided at their free ends with counterbalancing weights. The cores to be baked or dried are initially placed on the outside of the oven on a series of racks arranged collectively one above the other in a frame mounted on wheels, the whole being then run back into the oven and the oven door closed. On completion of the baking process the door is opened and the frame carrying the dried cores is withdrawn from the oven. The disadvantages of this arrangement are that, in charging the oven and removing the baked cores therefrom, it is necessary to fully open the oven door which causes considerable loss of heat from the oven; also, owing to their varying size and character, some of the cores require less time to bake than others, and to remove them from the oven when baked necessitates opening the door and prematurely removing the other cores therewith, which causes loss of heat both from these unbaked cores and from the oven, besides a waste of time and labor.

Our invention has for its object to minimize these objections, to economize heat, time, and labor, and to facilitate the charging of the oven and removal of the cores therefrom.

Our invention consists in certain features of novelty hereinafter more fully described and claimed.

Referring to the drawings, A represents our improved core oven (shown in duplicate adjoining each other side by side in Fig. 2), which consists preferably, of a rectangular-shaped drying chamber $a$ for receiving the cores to be baked, said chamber being preferably open at each end, and its walls being lined with fire-brick or other suitable refractory material.

Beneath the chamber $a$ is arranged a suitable furnace $b$ which is covered and separated from the lower part of the chamber $a$ by a fire-brick arch 1, through which are formed vertical openings 2 for the passage therethrough of the products of combustion from the furnace $b$ into the drying chamber $a$, and from which they are allowed to escape either through the flue 3 (Figs. 2 and 3) in the side wall 4 and stack 4', or through the flue 5 at the top of the chamber $a$ (the flue 3 in such case being closed by the dampers 6 above the oven A as shown) into the overhead flue pipe or chimney 7. The gases from the chamber $a$ may be allowed to pass through both the flues 3 and 5 simultaneously if desired.

Extending longitudinally through the drying chamber $a$ is a series of racks or core frames $c$ which are arranged horizontally, one above the other, at a suitable distance from each other and from the top and bottom of the end openings of the chamber $a$, each rack $c$ having a length over twice the length of the chamber, so that when in operation as hereinafter more particularly referred to, the end portions of the rack $c$ will project through the said openings beyond the end of the oven A. Each rack $c$ in the present case, consists preferably of two side longitudinal I-beams 8, and two intermediate longitudinal I-beams 9, which are arranged parallel to each other and connected together by cross members 10, or otherwise, so as to form a strong and rigid frame, preferably somewhat less in width than the inside width of the drying chamber $a$. Each rack $c$ is supported and adapted to ride longitudinally on a series of suitable anti-friction rollers arranged preferably as follows: Beneath each side (the side beam 8 in this case) of the rack $c$ on the outside of the oven A adjacent to each end opening of the chamber $a$, is a roller $d$ which is adapted to bear against the underside of the rack $c$, said roller being axially mounted in a suitable bearing 11 fixed to an upright member 12 which is preferably spaced apart from the corresponding end of the oven A, and connected at the top above the latter to the corresponding upright 12 at the other end of the oven by a horizontal beam 13.

The frame composed of the members 12 and 13 is supported at the base on suitable foundations 14 formed either by the brickwork setting of the oven A as shown, or independently thereof in any suitable manner. Furthermore, each rack $c$ is adapted to be similarly supported by and ride at its end portions on rollers $d'$ which are arranged in alinement with the rollers $d$ at a suitable distance therefrom and axially mounted in bearings 11' fixed to the upright members 12' which are supported at their base on suitable foundations 14' as shown, or otherwise as found most suitable.

Across the top of each rack $c$ in the middle and adjacent to each end thereof respectively, is fixed or formed an upright plate or member $e$, $e'$, which forms a door or apron adapted for opening and closing a corresponding portion of the end openings of the chamber $a$, the distance between the middle door $e$ and each end door $e'$ being equal to the length of the chamber $a$ between its said openings, whereby, on moving the rack $c$ longitudinally to its extreme position in either direction, the middle door $e$ closes that portion of the end opening of the chamber $a$ above the rack $c$ at the end of the oven A to which the rack $c$ is moved and at the same time the end doors $e'$ close to a similar extent, the opposite end opening of the chamber $a$, that part of the rack $c$ between the middle door $e$ and the said end door $e'$ being within the drying chamber $a$, while that part of the rack $c$ between the middle door $e$ and the other end door $e'$ projects beyond the oven A; in other words, by using a series of independently operated racks $c$ having one-half of each rack $c$ loaded with cores within the oven A while its other half is outside the oven A ready for being charged, combined with the automatic opening and closing of the oven A by doors $e$ movable with the racks $c$, considerable time and labor are saved in operating the oven and the heat therein is conserved and economized.

Suitable handles 15 and 16 are preferably fixed to the ends of the racks $c$, whereby the latter are moved longitudinally on their rollers $d$, and $d'$ in either direction through the oven A.

To provide sufficient clearance for the doors $e$, $e'$, at the top, in the movement of the racks $c$ to and fro beneath each other, and at the same time insure the proper closing of the oven openings by the doors $e$, $e'$, we preferably use a series of horizontally arranged flat bars or flaps $f$ (seen particularly in Fig. 6), which depend from and are hinged along their upper edges to the undersides of the racks $c$ in the plane of the doors $e$, $e'$, and in the path of the moving racks $c$, whereby the doors $e$, $e'$, in closing the opening of the oven A engage the hinged flaps $f$ and form therewith a practically tight closing of the said openings. The doors $e$, $e'$ when moved from their closed position, displace the flaps $f$ about their hinges until the doors $e$, $e'$ are clear, whereupon the flaps $f$ will swing back to their normal positions.

Our improved oven is comparatively simple in construction and operation, conserves and economizes the heat, and by the use of the improved oven much time and labor are saved in baking and drying mold cores, and the like.

It will be readily understood that minor changes in the form, size and construction of our improved oven may be made and substituted for those herein shown and described without departing from the spirit of our invention, the scope of which is set forth in the appended claims.

We claim:

1. In a core oven, a drying chamber having opposite door openings, a series of racks arranged one above the other and adapted respectively to support a core, and to be moved in opposite directions through the said openings, roller supports for the racks, vertically disposed members projecting upward from the racks for closing the said openings in the different positions of the racks, and hinged flaps depending from each rack for engagement with the upper edges of the vertically disposed members of the lower succeeding rack.

2. In a core oven, a drying chamber having openings formed in two opposite walls, a series of racks arranged one above the other and movable in opposite directions through the door openings, and means carried by each rack for closing the openings in the different positions of the rack, which means comprises a series of vertically disposed plates projecting upwardly from each rack and a corresponding series of hinged flaps depending from each rack which flaps are arranged beneath the vertically disposed walls.

3. In a core oven, a drying chamber having oppositely disposed door openings, a rack adapted to support a core and movable in opposite directions through the openings, means carried by the rack for closing the openings in the different positions of the rack, which means comprises a series of vertically disposed walls projecting upwardly from the rack and a corresponding series of hinged flaps depending from the rack, and roller bearings arranged on opposite sides of the chamber at suitable distances therefrom for supporting the outer end of the rack.

4. In a core oven, a drying chamber having door openings formed in two opposite walls, a rack adapted to support a core and movable in opposite directions through the openings in the chamber and means carried by said rack for closing the openings in the different positions of the rack, which means comprises parts rigidly fixed to the rack and corresponding parts hinged to the rack.

5. In a core oven, the combination with a drying chamber having door openings in two opposite walls, of a rack movable in opposite directions through said openings and a series of members hinged to and depending from said rack for partially closing the door openings in the different positions of the rack.

6. In a core oven, the combination with a chamber having door openings in two opposite walls, of a pair of racks arranged one above the other movable in opposite directions through the door openings, a series of upwardly projecting plates carried by the lower one of the racks, and a corresponding series of hinged members depending from the upper one of the racks which hinged members coöperate with the plates for closing the door openings in the different positions of the racks.

In testimony whereof we hereunto affix our signatures in the presence of two witnesses, this 25th day of April, 1911.

CHARLES F. FREDE.
HARRY M. PFLAGER.

Witnesses:
C. G. WESTLAKE,
HAL C. BELLVILLE.